Figure 1:
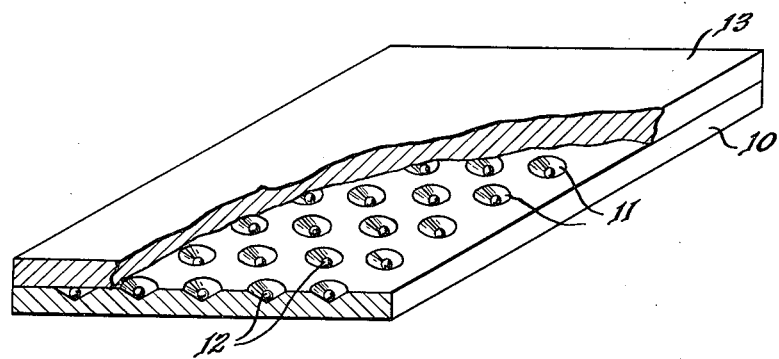

Nov. 14, 1961  G. H. SCHIPPEREIT ET AL  3,008,884
PROCESS FOR MAKING NEUTRON-ABSORBING BODIES
Filed July 9. 1958

INVENTORS
George H. Schippereit
Robert M. Lang
BY
Roland A. Anderson
Attorney

3,008,884
PROCESS FOR MAKING NEUTRON-ABSORBING BODIES

George H. Schippereit, Columbus, Ohio, and Robert M. Lang, Torrance, Calif., assignors to the United States of America as represented by the United States Atomic Energy Commission
Filed July 9, 1958, Ser. No. 747,550
2 Claims. (Cl. 204—154.2)

This invention relates to a process for making a control element for a nuclear reactor and to the control element prepared by this process. In more detail the invention concerns the preparation of a control plate containing a plurality of relatively large, uniformly-spaced, spherical bodies of boron.

It is known that nuclear reactors may be controlled by control elements formed of or containing a material having a high thermal neutron capture cross section. Two of the better known materials for this purpose are boron and cadmium although others have suggested. Boron is particularly suitable because of its low cost, high melting point, long life, large number of atoms per unit volume, and low mass for a given effect. The boron may be natural boron or boron enriched in the $B^{10}$ isotope.

Because of its physical properties boron must be employed in a matrix of another material. This matrix material must be comparatively inexpensive, ductile, and resistant to corrosion under the conditions to which it will be subjected. Such materials as stainless steel, aluminum, zirconium, or a zirconium-tin alloy known as Zircalloy-2, which contains 1.5% tin, 0.12% iron, 0.10% chromium, and 0.05% nickel in addition to zirconium, may be used.

A relatively thin plate formed of one of the above-mentioned materials and containing boron dispersed therein is particularly useful as a control element for a nuclear reactor. It may be used, for instance, in the reactor disclosed in FIG. 25 of Fermi et al. Patent No. 2,708,656.

It is possible to disperse boron in such a plate in the form of a fine powder without a great deal of difficulty. It is, however, difficult to disperse relatively large bodies of boron evenly in a plate. Prior art methods for introducing boron in relatively large bodies into a Zircalloy-2 plate resulted in uneven bodies, usually ending up as stringers, as a result of rolling operations.

Large bodies are preferable to small ones because bombardment of boron with neutrons results in the emission of alpha particles. These particles are large in size but have low penetrating power. Therefore the surface about each body is subject to considerable stress caused by the bombardment. The result of the bombardment is a deformation of the atomic structure and a weakened structure. A plate of Zircalloy-2 containing finely divided inclusions of boron is so seriously affected by neutron bombardment that it cannot be used as a control element for any great length of time due to the possibility that it will shatter. Because of this effect the tendency has been to go to control materials other than boron.

However, for a given amount of boron, less damage will be done to the matrix material when large inclusions are present in the matrix than when small inclusions are present because the total surface area of boron will decrease as the boron bodies are made larger. A plate containing uniformly-spaced, relatively large inclusions of boron is therefore useful as a control element for a nuclear reactor.

It is accordingly an object of the present invention to develop a process for making a control element for a nuclear reactor.

It is a more detailed object of the present invention to make a control element for a nuclear reactor containing relatively large, uniformly-spaced, spherical inclusions of boron.

It is a specific object of the present invention to make a control element for a nuclear reactor comprising a plate formed of a zirconium-tin alloy containing a plurality of uniformly-spaced, spherical inclusions of boron having centers located in a common plane.

These and other objects of the present invention are satisfied by our novel method which comprises punching equally-spaced, conically-shaped depressions in one face of a plate, placing spheres of boron of nearly uniform size in said depressions, placing another plate on top of the first-mentioned plate, welding the two plates together and rolling the joined plates to the desired thickness.

FIGURE 1 of the drawing is a partially cut-away perspective view of an assembly prior to the rolling operation.

Figure 2:
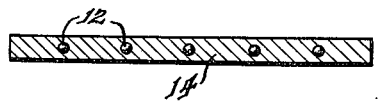

FIGURE 2 is a cross-sectional view of the completed article.

In FIGURE 1, plate 10 has conically-shaped depressions 11 formed therein. Spheres of boron 12 are located in the depressions 11. Another plate 13 is placed over the first-mentioned plate. After assembly as shown, the plates are welded together and rolled. FIGURE 2 shows the completed article as being an integral plate 14 containing uniformly-spaced, spherical inclusions of boron having centers located in a common plane. According to the present method the boron spheres do not disintegrate or elongate after rolling, but maintain their spherical shape and relative position in the plate, because the metal of the plate deforms under rolling so that the conical depression changes to a depression within which the ball just fits.

The boron spheres should be nearly perfect spheres of uniform size. They may be formed by dropping bodies of boron of predetermined size through a tube which is filled with an argon atmosphere and which is at a temperature of from 4500 to 5000° F. The boron bodies fall into a chamber filled with argon gas. The bodies melt while falling through the tube and solidify in the chamber as nearly perfect spheres of uniform size.

Construction of a specific control element will next be described. Conically-shaped depressions were punched to a depth of 0.012 inch in a 4" x 1½" x ⅒" Zircalloy-2 plate. The vertex angle of the conically-shaped depressions was 60 degrees. The depressions were located in rectangular arrangement ⅜ inch apart center to center. Spherical balls of boron produced as described above were placed in the depressions. These balls were 0.010 to 0.015 inch in diameter. Another 4" x 1½" x ⅒" plate was welded on top of the first plate, covering the depressions and the spheres of boron. The two plates were welded together under a vacuum. The resulting assembly was then rolled at a temperature of 1450° F. to a plate .067 inch thick. Microexamination of the resulting plate revealed a majority of the boron spheres had retained their spherical shape.

It will be understood that this invention is not to be limited to the details given herein, but that it may be modified within the scope of the appended claims.

What is claimed is:

1. A process for making a control element for a nuclear reactor comprising forming equally-spaced, conically-shaped depressions in one face of a plate formed of a material selected from the group consisting of aluminum, stainless steel, zirconium and zirconium-tin alloys, placing spheres of boron of nearly uniform size in the said depressions, placing another plate on top of the first-mentioned plate covering the depressions and boron spheres contained therein, welding the two plates together, and rolling the joined plates to the desired thickness.

2. A control element for a nuclear reactor comprising a plate of a zirconium-tin alloy containing a plurality of uniformly spaced boron spheres having a diameter of about 0.010 to 0.015 inch and having the centers of all such spheres contained within the plate located in a common plane.

References Cited in the file of this patent

UNITED STATES PATENTS

| | | |
|---|---|---|
| 2,503,537 | Youngblood | Apr. 11, 1950 |
| 2,727,996 | Rockwell | Dec. 20, 1955 |
| 2,861,035 | Zinn et al. | Nov. 18, 1958 |
| 2,863,817 | Morris | Dec. 9, 1958 |

OTHER REFERENCES

KAPL–1726, unclassified AEC report dated June 15, 1957, pages 12, 13.